(12) United States Patent
Melanson et al.

(10) Patent No.: US 8,008,898 B2
(45) Date of Patent: Aug. 30, 2011

(54) SWITCHING REGULATOR WITH BOOSTED AUXILIARY WINDING SUPPLY

(75) Inventors: John L. Melanson, Austin, TX (US); Mauro L. Gaetano, Austin, TX (US); Karl Thompson, Converse, TX (US)

(73) Assignee: Cirrus Logic, Inc., Austin, TX (US)

( * ) Notice: Subject to any disclaimer, the term of this patent is extended or adjusted under 35 U.S.C. 154(b) by 261 days.

(21) Appl. No.: 12/242,298

(22) Filed: Sep. 30, 2008

(65) Prior Publication Data

US 2009/0190379 A1 Jul. 30, 2009

Related U.S. Application Data

(60) Provisional application No. 61/024,583, filed on Jan. 30, 2008, provisional application No. 61/083,717, filed on Jul. 25, 2008.

(51) Int. Cl.
*G05F 1/613* (2006.01)
(52) U.S. Cl. ............... 323/222; 323/282; 323/901
(58) Field of Classification Search .......... 323/222, 323/282, 901; 363/21.08, 21.16, 49, 89
See application file for complete search history.

(56) References Cited

U.S. PATENT DOCUMENTS

| 3,316,495 | A | 4/1967 | Sherer |
| 3,423,689 | A | 1/1969 | Miller et al. |
| 3,586,988 | A | 6/1971 | Weekes |
| 3,725,804 | A | 4/1973 | Langan |
| 3,790,878 | A | 2/1974 | Brokaw |
| 3,881,167 | A | 4/1975 | Pelton et al. |
| 4,075,701 | A | 2/1978 | Hofmann |
| 4,334,250 | A | 6/1982 | Theus |
| 4,414,493 | A | 11/1983 | Henrich |
| 4,476,706 | A | 10/1984 | Hadden et al. |
| 4,677,366 | A | 6/1987 | Wilkinson et al. |
| 4,683,529 | A | 7/1987 | Bucher |

(Continued)

FOREIGN PATENT DOCUMENTS

EP 1014563 6/2000

(Continued)

OTHER PUBLICATIONS

U.S. Appl. No. 12/493,045, filed Jun. 26, 2009, Melanson.

(Continued)

*Primary Examiner* — Adolf Berhane
*Assistant Examiner* — Fred E Finch, III
(74) *Attorney, Agent, or Firm* — Mitch Harris, Atty at Law, LLC; Andrew M. Harris

(57) ABSTRACT

A boosted auxiliary winding power supply for a switched-power converter circuit provides operating voltage for control and other circuits early in the start-up phase of converter operation. A boost circuit has an input coupled to the auxiliary winding to boost the voltage available from the auxiliary winding at least during start-up of the switched-power converter. The boost thereby provides a voltage that is greater than the voltage across the auxiliary winding during start-up of the switched-power converter. The boost circuit may be actively switched at a rate higher than a switching rate of the switched-power converter, to increase a rate of rise of the operating voltage. Polarity information, which may be provided from the switched-power converter control circuit, can be used to actively rectify the output of the auxiliary winding.

27 Claims, 5 Drawing Sheets

U.S. PATENT DOCUMENTS

| | | | |
|---|---|---|---|
| 4,697,210 A | 9/1987 | Toyota et al. | |
| 4,700,188 A | 10/1987 | James | |
| 4,737,658 A | 4/1988 | Kronmuller et al. | |
| 4,797,633 A | 1/1989 | Humphrey | |
| 4,937,728 A | 6/1990 | Leonardi | |
| 4,940,929 A | 7/1990 | Williams | |
| 4,973,919 A | 11/1990 | Allfather | |
| 4,979,087 A | 12/1990 | Sellwood et al. | |
| 4,980,898 A | 12/1990 | Silvian | |
| 4,992,919 A | 2/1991 | Lee et al. | |
| 4,994,952 A | 2/1991 | Silva et al. | |
| 5,001,620 A | 3/1991 | Smith | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A * | 6/1995 | Inou et al. | 363/21.06 |
| 5,477,481 A | 12/1995 | Kerth | |
| 5,479,333 A * | 12/1995 | McCambridge et al. | 363/49 |
| 5,481,178 A | 1/1996 | Wilcox et al. | |
| 5,565,761 A | 10/1996 | Hwang | |
| 5,589,759 A * | 12/1996 | Borgato et al. | 323/222 |
| 5,638,265 A | 6/1997 | Gabor | |
| 5,691,890 A | 11/1997 | Hyde | |
| 5,747,977 A | 5/1998 | Hwang | |
| 5,757,635 A * | 5/1998 | Seong | 323/222 |
| 5,764,039 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A * | 8/1998 | Hwang et al. | 323/222 |
| 5,834,858 A | 11/1998 | Crosman, III et al. | |
| 5,900,683 A | 5/1999 | Rinehart et al. | |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,960,207 A | 9/1999 | Brown | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,150,774 A | 11/2000 | Mueller et al. | |
| 6,181,114 B1 * | 1/2001 | Hemena et al. | 323/222 |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,385,063 B1 | 5/2002 | Sadek et al. | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,580,258 B2 | 6/2003 | Wilcox et al. | |
| 6,583,550 B2 | 6/2003 | Iwasa et al. | |
| 6,628,106 B1 * | 9/2003 | Batarseh et al. | 323/222 |
| 6,636,003 B2 | 10/2003 | Rahm et al. | |
| 6,646,848 B2 | 11/2003 | Yoshida et al. | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Anderson et al. | |
| 6,753,661 B2 | 6/2004 | Muthu et al. | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shytenberg et al. | |
| 6,956,750 B1 | 10/2005 | Eason et al. | |
| 6,958,920 B2 | 10/2005 | Mednik et al. | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 * | 12/2005 | Kim et al. | 363/56.11 |
| 6,980,446 B2 * | 12/2005 | Simada et al. | 363/49 |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,573 B2 | 1/2007 | Hershbarger | |
| 7,158,633 B1 | 1/2007 | Hein | |
| 7,161,816 B2 | 1/2007 | Shytenberg et al. | |
| 7,183,957 B1 | 2/2007 | Melanson | |
| 7,212,640 B2 | 5/2007 | Bizjak | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,272,585 B2 | 9/2007 | Nomura et al. | |
| 7,288,902 B1 | 10/2007 | Melanson | |
| 7,289,054 B1 | 10/2007 | Watanabe | |
| 7,292,013 B1 | 11/2007 | Chen et al. | |
| 7,310,244 B2 | 12/2007 | Yang et al. | |
| 7,331,226 B2 | 2/2008 | Feldman et al. | |
| 7,345,458 B2 * | 3/2008 | Kanai et al. | 323/222 |
| 7,375,476 B2 | 5/2008 | Walter et al. | |
| 7,382,635 B2 | 6/2008 | Noda | |
| 7,394,210 B2 | 7/2008 | Ashdown | |
| 7,511,437 B2 | 3/2009 | Lys et al. | |
| 7,538,499 B2 | 5/2009 | Ashdown | |
| 7,545,130 B2 | 6/2009 | Latham | |
| 7,554,473 B2 | 6/2009 | Melanson | |
| 7,569,996 B2 | 8/2009 | Holmes et al. | |
| 7,583,136 B2 | 9/2009 | Pelly | |
| 7,656,103 B2 | 2/2010 | Shteynberg et al. | |
| 7,710,047 B2 | 5/2010 | Shteynberg et al. | |
| 7,719,248 B1 | 5/2010 | Melanson | |
| 7,746,043 B2 | 6/2010 | Melanson | |
| 7,746,671 B2 | 6/2010 | Radecker et al. | |
| 7,750,738 B2 | 7/2010 | Bach | |
| 7,804,256 B2 | 9/2010 | Melanson | |
| 2002/0145041 A1 | 10/2002 | Muthu et al. | |
| 2002/0150151 A1 | 10/2002 | Krone et al. | |
| 2002/0166073 A1 | 11/2002 | Nguyen et al. | |
| 2003/0095013 A1 | 5/2003 | Melanson et al. | |
| 2003/0174520 A1 | 9/2003 | Bimbaud | |
| 2003/0223255 A1 | 12/2003 | Ben-Yaakov | |

| Publication No. | Date | Inventor |
|---|---|---|
| 2004/0004465 A1* | 1/2004 | McGinnis ............ 323/267 |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0207190 A1 | 9/2005 | Gritter |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0022916 A1 | 2/2006 | Aiello |
| 2006/0023002 A1 | 2/2006 | Hara et al. |
| 2006/0125420 A1 | 6/2006 | Boone et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0103949 A1 | 5/2007 | Tsuruya |
| 2007/0124615 A1 | 5/2007 | Orr |
| 2007/0182699 A1 | 8/2007 | Ha et al. |
| 2007/0231009 A1 | 10/2007 | Watahiki |
| 2008/0012502 A1 | 1/2008 | Lys |
| 2008/0043504 A1 | 2/2008 | Ye et al. |
| 2008/0054815 A1 | 3/2008 | Kotikalapoodi et al. |
| 2008/0130322 A1 | 6/2008 | Artusi et al. |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0174479 A1 | 7/2009 | Yan et al. |
| 2009/0190384 A1 | 7/2009 | Thompson |
| 2009/0191837 A1 | 7/2009 | Nanda et al. |
| 2009/0218960 A1 | 9/2009 | Lyons et al. |

FOREIGN PATENT DOCUMENTS

| | | |
|---|---|---|
| EP | 1164819 | 12/2001 |
| EP | 1213823 | 6/2002 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |

OTHER PUBLICATIONS

U.S. Appl. No. 12/495,648, filed Jun. 30, 2009, Melanson.
U.S. Appl. No. 12/495,720, filed Jun. 30, 2009, Melanson.
AN-H52 Application Note: "HV9931 Unity Power Factor LED Lamp Driver" Mar. 7, 2007, Supertex Inc., Sunnyvale, CA, USA.
"HV9931 Unity Power Factor LED Lamp Driver, Initial Release", Supertex Inc., Sunnyvale, CA USA 2005.
A. Prodic, Compensator Design and Stability Assessment for Fast Voltage Loops of Power Factor Correction Rectifiers, IEEE Transactions on Power Electronics, vol. 22, No. 5, Sep. 2007.
A. R. Seidel, et al., A Practical Comparison Among High-Power-Factor Electronic Ballasts with Similar Ideas, IEEE Transactions on Industry Applications, vol. 41, No. 6, Nov.-Dec. 2005.
A. Silva De Morais, et al., A High Power Factor Ballast Using a Single Switch with Both Power Stages Integrated, IEEE Transactions on Power Electronics, vol. 21, No. 2, Mar. 2006.
Abramovitz, et al., "A Resonant DC-DC Transformer With Zero Current Ripple", IEEE Transactions on Power Electronics, Nov. 2007, p. 2344-2351, vol. 22, No. 6.
AD7400 Datasheet, "Isolated Sigma-Delta Modulator", Analog Devices 2006.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Analog Devices, "120 kHz Bandwidth, Low Distortion, Isolation Amplifier", AD215, Norwood, MA, 1996.
Analog Devices, "Isolated Sigma-Delta Modulator", AD7400, Analog Devices, Norwood, MA, 2006.
Azoteq, IQS17 Family, IQ Switch®—ProxSense™ Series, Touch Sensor, Load Control and User Interface, IQS17 Datasheet V2.00. doc, Jan. 2007.
B.A. Miwa, et al., High Efficiency Power Factor Correction Using Interleaved Techniques, Applied Power Electronics Conference and Exposition, Seventh Annual Conference Proceedings, Feb. 23-27, 1992.
Barragan, et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.
BB3656 Datasheet "Transformer Coupled Isolation Amplifier", Burr-Brown 1987.
Ben-Yaakov, et al., "The Dynamics of a PWM Boost Converter with Resistive Input" IEEE Transactions on Industrial Electronics, IEEE Service Center, Piscataway, NJ, USA, vol. 46, No. 3, Jun. 1, 1999.
Bhat, et al. "Analysis and Design of a High-Frequency Resonant Converter Using LCC-Type Commutation", IEEE Transactions on Power Electronics, Oct. 1987, p. 291-301, vol. PE-2 No. 4.
Burr-Brown, "Transformer Coupled Isolation Amplifier", BB3656 Datasheet, Tucson, AZ, 1987.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
C. Dilouie, Introducing the LED Driver, EC&M, Sep. 2004.
C. M. De Oliviera Stein, et al., A ZCT Auxiliary Communication Circuit for Interleaved Boost Converters Operating in Critical Conduction Mode, IEEE Transactions on Power Electronics, vol. 17, No. 6, Nov. 2002.
Chen, et al., "Generalized Optimal Trajectory Control for Closed Loop Control of Series-Parallel Resonant Converter", IEEE Transactions on Power Electronics, Sep. 2006, p. 1347-1355, vol. 21, No. 5.
Chromacity Shifts in High-Power White LED Systems due to Different Dimming Methods, Solid State Lighting, http://www.lrc.rpi.edu/programs/solidstate/completedProjects.asp?ID=76, printed May 3, 2007.
Color Temperature, www.sizes.com/units/color_temperature.htm, printed Mar. 27, 2007.
D. Hausman, Lutron, RTISS-TE Operation, Real-Time Illumination Stability Systems for Trailing-Edge (Reverse Phase Control) Dimmers, v. 1.0 Dec. 2004.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

D. Maksimovic, et al., "Switching Converters with Wide DC Conversion Range," Institute of Electrical and Electronic Engineers (IEEE) Transactions on Power Electronics, Jan. 1991.
D. Rand, et al., Issues, Models and Solutions for Triac Modulated Phase Dimming of LED Lamps, Power Electronics Specialists Conference, 2007.
D.K.W. Cheng, et al., A New Improved Boost Converter with Ripple Free Input Current Using Coupled Inductors, Power Electronics and Variable Speed Drives, Sep. 21-23, 1998.
Dallas Semiconductor, Maxim, "Charge-Pump and Step-Up DC-DC Converter Solutions for Powering White LEDs in Series or Parallel Connections," Apr. 23, 2002.
Data Sheet LT3496 Triple Output LED Driver, Linear Technology Corporation, Milpitas, CA 2007.
De Groot, et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.
Doyle, et al., Feedback Control Theory, Macmillan Publishing Co., 1990.
Dunn, Jamie, "Determining MOSFET Driver Needs for Motor Drive Applications," AN898 Application Note, Microchip Technology, Chandler, AZ, 2003.
Dustin Rand, et al., "Issues, Models and Solutions for Triac Modulated Phase Dimming of LED Lamps" Power Electronics Specialists Conferrence, 2007. PESC 2007. IEEE, IEEE, P1, Jun. 1, 2007, pp. 1398-1404.
Erickson, Robert W., et al., "Fundamentals of Power Electronics," Second Edition, Chapter 6, Boulder, CO, 2001.
F. T. Wakabayashi, et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
F. Tao, et al., "Single-Stage Power-Factor-Correction Electronic Ballast with a Wide Continuous Dimming Control for Fluorescent Lamps," IEEE Power Electronics Specialists Conference, vol. 2, 2001.
Fairchild Semiconductor, Application Note 42030, Theory and Application of the ML4821 Average Current Mode PFC Controller, Oct. 25, 2000.
Fairchild Semiconductor, Application Note 42030, Theory and Application of the ML4821 Average Current Mode PFC Controller, Aug. 1997.
Fairchild Semiconductor, Application Note 42047 Power Factor Correction (PFC) Basics, Rev. 0.9.0 Aug. 19, 2004.
Fairchild Semiconductor, Application Note 6004, 500W Power-Factor-Corrected (PFC) Converter Design with FAN4810, Rev. 1.0.1, Oct. 31, 2003.
Fairchild Semiconductor, Application Note AN4121, Design of Power Factor Correction Circuit Using FAN7527B, Rev.1.0.1, May 30, 2002.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVA Average Current PFC Controller, Rev. 1.0.1 Aug. 10, 2001.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, FAN7532, Ballast Controller, Rev. 1.0.2, Jun. 2006.
Fairchild Semiconductor, FAN7544, Simple Ballast Controller, Rev. 1.0.0, 2004.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
Fairchild Semiconductor, ML4812, Power Factor Controller, Rev. 1.0.4, May 31, 2001.
Fairchild Semiconductor, ML4821, Power Factor Controller, Jun. 19, 2001.
Fairchild Semiconductor, ML4821, Power Factor Controller, Rev. 1.0.2, Jun. 19, 2001.
Feng, et al., "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.
Foster, et al., "Cyclic-Averaging for High Speed Analysis of Resonant Converters", IEEE Transactions on Power Electronics, Jul. 2003, p. 985-993, vol. 18, No. 4.
Freescale Semiconductor, AN1965, Design of Indirect Power Factor Correction Using 56F800/E, Jul. 2005.
Freescale Semiconductor, AN3052, Implementing PFC Average Current Mode Control Using the MC9S12E128, Nov. 2005.
Freescale Semiconductor, Inc., Dimmable Light Ballast with Power Factor Correction, Design Reference Manual, DRM067, Rev. 1, Dec. 2005.
G. Yao, et al., Soft Switching Circuit for Interleaved Boost Converters, IEEE Transactions on Power Electronics, vol. 22, No. 1, Jan. 2007.
Gu, et al., "Three-Level LLC Series Resonant DC/DC Converter," IEEE Transactions on Power Electronics, vol. 20, No. 4, p. 781-789, Jul. 2005.
H. L. Cheng, et al., A Novel Single-Stage High-Power-Factor Electronic Ballast with Symmetrical Topology, IEEE Transactions on Power Electronics, vol. 50, No. 4, Aug. 2003.
H. Peng, et al., Modeling of Quantization Effects in Digitally Controlled DC-DC Converters, IEEE Transactions on Power Electronics, vol. 22, No. 1, Jan. 2007.
H. Wu, et al., Single Phase Three-Level Power Factor Correction Circuit with Passive Lossless Snubber, IEEE Transactions on Power Electronics, vol. 17, No. 2, Mar. 2006.
Hattrup, et al., "Fast Estimation Techniques for Digital Control of Resonant Converters", IEEE Transactions on Power Electronics, Jan. 2003, p. 365-372, vol. 18, No. 1.
Hirota, Atsushi, et al., "Analysis of Single Switch Delta-Sigma Modulated Pulse Space Modulation PFC Converter Effectively Using Switching Power Device," IEEE, US, 2002.
Infineon, CCM-PFC Standalone Power Factor Correction (PFC) Controller in Continuous Conduction Mode (CCM), Version 2.1, Feb. 6, 2007.
International Rectifier, Application Note AN-1077,PFC Converter Design with IR1150 One Cycle Control IC, rev. 2.3, Jun. 2005.
International Rectifier, Data Sheet No. PD60230 revC, IR1150(S)(PbF), uPFC One Cycle Control PFC IC Feb. 5, 2007.
International Rectifier, Data Sheet PD60230 revC, Feb. 5, 2007.
International Rectifier, IRAC1150-300W Demo Board, Users Guide, Rev 3.0, Aug. 2, 2005.
Intersil, "Designing with the ISL6752, ISL6753 ZVS Full-Bridge Controllers," Application Note AN1262.0, Aug. 15, 2006.
Intersil, AN1262.0, "Designing with the ISL6752, ISL6753 ZVS Full-Bridge Controllers", Aug. 2006.
J. A. Vilela Jr., et al., An Electronic Ballast with High Power Factor and Low Voltage Stress, IEEE Transactions on Industry Applications, vol. 41, No. 4, Jul./Aug. 2005.
J. Qian et al., Charge Pump Power-Factor-Correction Technologies Part II: Ballast Applications, IEEE Transactions on Power Electronics, vol. 15, No. 1, Jan. 2000.
J. Qian, et al., New Charge Pump Power-Factor-Correction Electronic Ballast with a Wide Range of Line Input Voltage, IEEE Transactions on Power Electronics, vol. 14, No. 1, Jan. 1999.
J. Turchi, Four Key Steps to Design a Continuous Conduction Mode PFC Stage Using the NCP1653, ON Semiconductor, Publication Order No. AND184/D, Nov. 2004.
J. Zhou, et al., Novel Sampling Algorithm for DSP Controlled 2 kW PFC Converter, IEEE Transactions on Power Electronics, vol. 16, No. 2, Mar. 2001.
J.W.F. Dorleijn, et al., Standardisation of the Static Resistances of Fluorescent Lamp Cathodes and New Data for Preheating, Industry Applications Conference, vol. 1, Oct. 13-18, 2002.
K. Leung, et al., "Dynamic Hysteresis Band Control of the Buck Converter with Fast Transient Response," IEEE Transactions on Circuits and Systems—II: Express Briefs, vol. 52, No. 7, Jul. 2005.

K. Leung, et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K.M. Smedley, One-Cycle Control of Switching Converters, IEEE Transactions on Power Electronics, vol. 10, No. 6, Nov. 1995.

L. Balogh, et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7-11, 1993.

L. Gonthier, et al., EN55015 Compliant 500W Dimmer with Low-Losses Symmetrical Switches, 2005 European Conference on Power Electronics and Applications, Sep. 2005.

Laouamri, et al., "Modeling and Analysis of Wound Integrated LCT Structure for Single Stage Resonant PFC Rectifier", IEEE Transactions on Power Electronics, Jan. 2003, p. 256-269, vol. 18, No. 1.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Lilei Gu, et al., "Three-Level LLC Series Resonant DC/DC Converter", IEEE Transactions on Power Electronics, Jul. 2005, p. 781-789, vol. 20, No. 4.

Lin et al., "Robust Controller Design for a Series Resonant Converter via Duty-Cycle Control", IEEE Transactions on Power Electronics, Sep. 1999, p. 793-802, vol. 14 No. 5.

Linear Technology, LTC3705 Datasheet, 2005 Linear Technology, Inc.

Linear Technology, 100 Watt LED Driver, Linear Technology, 2006.

Linear Technology, LT1248, Power Factor Controller, Apr. 20, 2007.

Linear Technology, News Release,Triple Output LED, LT3496, Linear Technology, Milpitas, CA, May 24, 2007.

Linear Technology,"2-Switch Forward Controller and Gate Driver," LTC3705 Datasheet, Linear Technology, Inc., Milpitas, CA, 2005.

Lu, et al., International Rectifier, Bridgeless PFC Implementation Using One Cycle Control Technique, 2005.

Lu, et al., "Quasi Current Mode Control for the Phase-Shifted Series Resonant Converter," IEEE Transactions on Power Electronics, vol. 23, No. 1, p. 353-358, Jan. 2008.

M. Brkovic, et al., "Automatic Current Shaper with Fast Output Regulation and Soft-Switching," S.15.C Power Converters, Telecommunications Energy Conference, 1993.

M. K. Kazimierczuk, et al., Electronic Ballast for Fluorescent Lamps, IEEETransactions on Power Electronics, vol. 8, No. 4, Oct. 1993.

M. Madigan, et al., Integrated High-Quality Rectifier-Regulators, IEEE Transactions on Industrial Electronics, vol. 46, No. 4, Aug. 1999.

M. Ponce, et al., High-Efficient Integrated Electronic Ballast for Compact Fluorescent Lamps, IEEE Transactions on Power Electronics, vol. 21, No. 2, Mar. 2006.

M. Radecker, et al., Application of Single-Transistor Smart-Power IC for Fluorescent Lamp Ballast, Thirty-Fourth Annual Industry Applications Conference IEEE, vol. 1, Oct. 3-7, 1999.

M. Rico-Secades, et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Mammano, B., Resonant Mode Converter Topologies, Texas Instruments, 2001.

Mangat et al., "A Modified Asymmetrical Pulse-Width-Modulated Resonant DC/DC Converter Topology", IEEE Transactions on Power Electronics, Jan. 2004, p. 104-111, vol. 19, No. 1.

Megaman, D or S Dimming ESL, Product News, Mar. 15, 2007.

National Lighting Product Information Program, Specifier Reports, "Dimming Electronic Ballasts," vol. 7, No. 3, Oct. 1999.

Noon, Jim "UC3855A/B High Performance Power Factor Preregulator", Texas Instruments, SLUA146A, May 1996,Revised Apr. 2004.

NXP, TEA1750, GreenChip III SMPS control IC Product Data Sheet, Apr. 6, 2007.

O. Garcia, et al., High Efficiency PFC Converter to Meet EN61000-3-2 and A14, Proceedings of the 2002 IEEE International Symposium on Industrial Electronics, vol. 3, 2002.

ON Semconductor, NCP1606, Cost Effective Power Factor Controller, Mar. 2007.

ON Semiconductor, AND8123/D, Power Factor Correction Stages Operating in Critical Conduction Mode, Sep. 2003.

ON Semiconductor, MC33260, GreenLine Compact Power Factor Controller: Innovative Circuit for Cost Effective Solutions, Sep. 2005.

ON Semiconductor, NCP1605, Enhanced, High Voltage and Efficient Standby Mode, Power Factor Controller, Feb. 2007.

ON Semiconductor, NCP1654, Product Review, Power Factor Controller for Compact and Robust, Continuous Conduction Mode Pre-Converters, Mar. 2007.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

P. Lee, et al., Steady-State Analysis of an Interleaved Boost Converter with Coupled Inductors, IEEE Transactions on Industrial Electronics, vol. 47, No. 4, Aug. 2000.

Philips, Application Note, 90W Resonant SMPS with TEA1610 SwingChip, AN99011, 1999.

Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11, 2008.

Prodic, A., et al., "Dead Zone Digital Controller for Improved Dynamic Response of Power Factor Preregulators," IEEE, 2003.

Prodic, Aleksandar, "Digital Controller for High-Frequency Rectifiers with Power Factor Correction Suitable for On-Chip Implementation," IEEE, US, 2007.

Q. Li, et al., An Analysis of the ZVS Two-Inductor Boost Converter under Variable Frequency Operation, IEEE Transactions on Power Electronics, vol. 22, No. 1, Jan. 2007.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

Renesas, HA16174P/FP, Power Factor Correction Controller IC, Jan. 6, 2006.

S. Ben-Yaakov, et al., Statics and Dynamics of Fluorescent Lamps Operating at High Frequency: Modeling and Simulation, IEEE Transactions on Industry Applications, vol. 38, No. 6, Nov.-Dec. 2002.

S. Chan, et al., Design and Implementation of Dimmable Electronic Ballast Based on Integrated Inductor, IEEE Transactions on Power Electronics, vol. 22, No. 1, Jan. 2007.

S. Dunlap, et al., Design of Delta-Sigma Modulated Switching Power Supply, Circuits & Systems, Proceedings of the 1998 IEEE International Symposium, 1998.

S. Lee, et al., A Novel Electrode Power Profiler for Dimmable Ballasts Using DC Link Voltage and Switching Frequency Controls, IEEE Transactions on Power Electronics, vol. 19, No. 3, May 2004.

S. Lee, et al., TRIAC Dimmable Ballast with Power Equalization, IEEE Transactions on Power Electronics, vol. 20, No. 6, Nov. 2005.

S. Skogstad, et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

S. T.S. Lee, et al., Use of Saturable Inductor to Improve the Dimming Characteristics of Frequency-Controlled Dimmable Electronic Ballasts, IEEE Transactions on Power Electronics, vol. 19, No. 6, Nov. 2004.

S. Zhou, et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

Spiazzi G, et al., "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.

ST Microelectronics, AN993, Application Note, Electronic Ballast with PFC Using L6574 and L6561, May 2004.
ST Microelectronics, L6574, CFL/TL Ballast Driver Preheat and Dimming, Sep. 2003.
ST Microelectronics, Power Factor Corrector L6561, Jun. 2004.
ST Microelectronics, L6563, Advanced Transition-Mode PFC Controller, Mar. 2007.
Supertex Inc., 56W Off-line LED Driver, 120VAC with PFC, 160V, 350mA Load, Dimmer Switch Compatible, DN-H05, Feb. 2007.
Supertex Inc., Buck-based LED Drivers Using the HV9910B, Application Note AN-H48, Dec. 28, 2007.
Supertex Inc., HV9931 Unity Power Factor LED Lamp Driver, Application Note An-H52, Mar. 7, 2007.
T. Wu, et al., Single-Stage Electronic Ballast with Dimming Feature and Unity Power Factor, IEEE Transactions on Power Electronics, vol. 13, No. 3, May 1998.
Texas Instruments, "BiCMOS Advanced Phase-Shift PWM Controller Datasheet," Dec. 1999, Rev. Apr. 2008.
Texas Instruments, "BiCMOS Advanced Phase-Shift PWM Controller Datasheet," UCC1895, UCC2895, UCC3895, Dec. 1999, Rev. Apr. 2008.
Texas Instruments, Application Note SLUA321, Startup Current Transient of the Leading Edge Triggered PFC Controllers, Jul. 2004.
Texas Instruments, Application Report SLUA308, UCC3817 Current Sense Transformer Evaluation, Feb. 2004.
Texas Instruments, Application Report SLUA369B, 350-W, Two-Phase Interleaved PFC Pre-Regulator Design Review, Mar. 2007.
Texas Instruments, Application Report SPRA902A, Average Current Mode Controlled Power Factor Correctiom Converter using TMS320LF2407A, Jul. 2005.
Texas Instruments, Application Report, SLUA309A, Avoiding Audible Noise at Light Loads when using Leading Edge Triggered PFC Converters, Sep. 2004.
Texas Instruments, SLOS318F, "High-Speed, Low Noise, Fully-Differential I/O Amplifiers," THS4130 and THS4131, US, Jan. 2006.
Texas Instruments, SLUS828B, "8-Pin Continuous Conduction Mode (CCM) PFC Controller", UCC28019A, US, revised Apr. 2009.
Texas Instruments, Transition Mode PFC Controller, SLUS515D, Jul. 2005.
Texas Instruments, UCC3817 BiCMOS Power Factor Preregulator Evaluation Board Users Guide, Nov. 2002.
Tuomainen, et al., "Effect of Resonant Transition on Efficiency of Forward Converter with Active Clamp and Self-Driven SRs", IEEE Transactions on Power Electronics, Mar. 2005, p. 315-323, vol. 20, No. 2.
Unitrode Products From Texas Instruments, BiCMOS Power Factor Preregulator, Feb. 2006.
Unitrode Products From Texas Instruments, High Performance Power Factor Preregulator, Oct. 2005.
Unitrode Products From Texas Instruments, Programmable Output Power Factor Preregulator, Dec. 2004.
Unitrode, Design Note DN-39E, Optimizing Performance in UC3854 Power Factor Correction Applications, Nov. 1994.
Unitrode, High Power-Factor Preregulator, Oct. 1994.
Unitrode, L. Balogh, Design Note UC3854A/B and UC3855A/B Provide Power Limiting with Sinusoidal Input Current for PFC Front Ends, SLUA196A, Nov. 2001.
V. Nguyen, et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
Vishwanathan, et al., "High Voltage DC Power Supply Topology for Pulsed Load Applications with Converter Switching Synchronized to Load Pulses," Power Electronics Group, Bangalore, India, Nov. 2003, vol. 1.
W. Zhang, et al., A New Duty Cycle Control Strategy for Power Factor Correction and FPGA Implementation, IEEE Transactions on Power Electronics, vol. 21, No. 6, Nov. 2006.
Why Different Dimming Ranges? The Difference Between Measured and Perceived Light, 2000 http://www.lutron.com/ballast/pdf/LutronBallastpg3.pdf.
Wong, et al., "Steady-state Analysis of Hysteretic Control Buck Converters", Power Electronics and Motion Control Conference, IEEE Press, New Jersey, Sep. 2008.
Xie, et al., "Analysis and Optimization of LLC Resonant Converter With a Novel Over-Current Protection Circuit", IEEE Transactions on Power Electronics, Mar. 2007, p. 435-443, vol. 22 No. 2.
Y. Ji, et al., Compatibility Testing of Fluorescent Lamp and Ballast Systems, IEEE Transactions on Industry Applications, vol. 35, No. 6, Nov./Dec. 1999.
Y. Ohno, Spectral Design Considerations for White LED Color Rendering, Final Manuscript, Optical Engineering, vol. 44, 111302 (2005).
Yan Lu, et al., "Quasi Current Mode Control for the Phase-Shifting Series Resonant Converter", IEEE Transactions on Power Electronics, Jan. 2008, p. 353-358, vol. 23 No. 1.
Ye, et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.
Z. Lai, et al., A Family of Power-Factor-Correction Controllers, Twelfth Annual Applied Power Electronics Conference and Exposition, vol. 1, Feb. 23-27, 1997.
Zhao, et al., "Steady-state and Dynamic Analysis of a Buck Converter Using a Hysteretic PWM Control", Power Electronics Specialists Conference, IEEE Press, New Jersey, Jun. 2004.
Zie, et al., "Analysis and Optimization of LLC Resonant Converter with a Novel Over-Current Protection Circuit," IEEE Transactions on Power Electronics, vol. 22, No. 2, p. 435-443, Mar. 2007.
Maksimovic, et al., "Impact of Digital Control in Power Electronics", Proceedings of the 2004 International Symposium on Power Semiconductor Devices & ICs, pp. 13-22, Kitakyushu, JP, 2004.
L6562 Datasheet, "Transition-Mode PFC Controller", ST Microelectronics, Nov. 2005, Geneva, Switzerland.
Linear Technology LT1950 Datasheet.
Mamano, Bob, "Current Sensing Solutions for Power Supply Designers", Unitrode Seminar Notes SEM1200, 1999.
Texas Instruments, Interleaving Continuous Conduction Mode PFC Controller, UCC28070, SLUS794C, Nov. 2007, revised Jun. 2009, Texas Instruments, Dallas TX.
http://toolbarpdf.com/docs/functions-and-features-of-inverters.html printed on Jan. 20, 2011.

* cited by examiner

SWITCHING REGULATOR WITH BOOSTED AUXILIARY WINDING SUPPLY

This application Claims priority under 35 U.S.C. §119(e) to U.S. Provisional Patent Application Ser. No. 61/024,583 filed on Jan. 30, 2008 and Ser. No. 61/083,717 filed on Jul. 25, 2008.

BACKGROUND OF THE INVENTION

1. Field of the Invention

The present invention relates generally to switching power regulator circuits, and more specifically, to a switching power converter in which an auxiliary winding power supply includes a boost circuit to increase available voltage.

2. Background of the Invention

In order to supply power to control circuits of a switching power converter, an auxiliary winding is sometimes used, particularly at start-up when the voltage of the converter output has not risen sufficiently, or in implementations in which deriving an internal low-voltage "auxiliary" power supply from the output or input of the converter is impractical or very inefficient, e.g., in high-voltage input converters. Since the auxiliary power supply typically does not have to source much current, the filter capacitor or LC circuit that removes large AC variations from the output of the auxiliary power supply can be small compared to the output filter of the converter. Therefore, the auxiliary power supply voltage can rise much more rapidly than the output of the converter and is available as a voltage source for control circuits much earlier than the output of the converter itself.

However, even an auxiliary winding-sourced power supply requires time for the filter capacitor or LC circuit that removes large AC variations from the auxiliary power supply output to charge to a sufficient voltage to operate the control circuits. Therefore, there is generally a start-up lag time required, during which converter switching circuits must be operated without the control circuits powered by the auxiliary winding.

Therefore, it would be desirable to provide an auxiliary power supply circuit and method that provide operating voltage for control and/or other circuits earlier in the start-up phase of a switching power regulator.

SUMMARY OF THE INVENTION

The above stated objective of providing operating voltage for control and/or other circuits powered by an auxiliary winding earlier in the start-up cycle of a switching converter is provided in a switching converter and a method of operation of the switching converter.

The switching converter has an inductive storage element including at least a primary and an auxiliary winding. The auxiliary winding is provided to a boost circuit that raises an available voltage of the auxiliary winding to a substantially higher voltage by actively switching an inductance, thereby providing the operating voltage for control and/or other circuits earlier in the start-up phase of the switching converter. The boost circuit may use the leakage inductance of the auxiliary winding, which may be wound to increase the leakage inductance, or an additional inductor may be used to provide an inductive storage element for the boost circuit.

The boost circuit may be switched at a rate higher than a switching rate of the switching converter in order to increase the rate of rise of the operating voltage. Polarity information, which may be provided from the control circuit that operates the switching converter in order to actively rectify the output of the auxiliary winding. The boost circuits may be integrated with the switching converter control circuits, and optionally the switching circuits, on a single die.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for providing power to control and/or other circuits internal to a switching power converter. The circuit operates from an auxiliary winding of the switching power converter and includes a boost circuit to boost the voltage available from the auxiliary winding, so that sufficient operating voltage for the control and/or other circuits is available earlier in the start-up phase of the switching power converter, than would otherwise be available from a passive rectifier/filter auxiliary power supply circuit.

Figure 1:
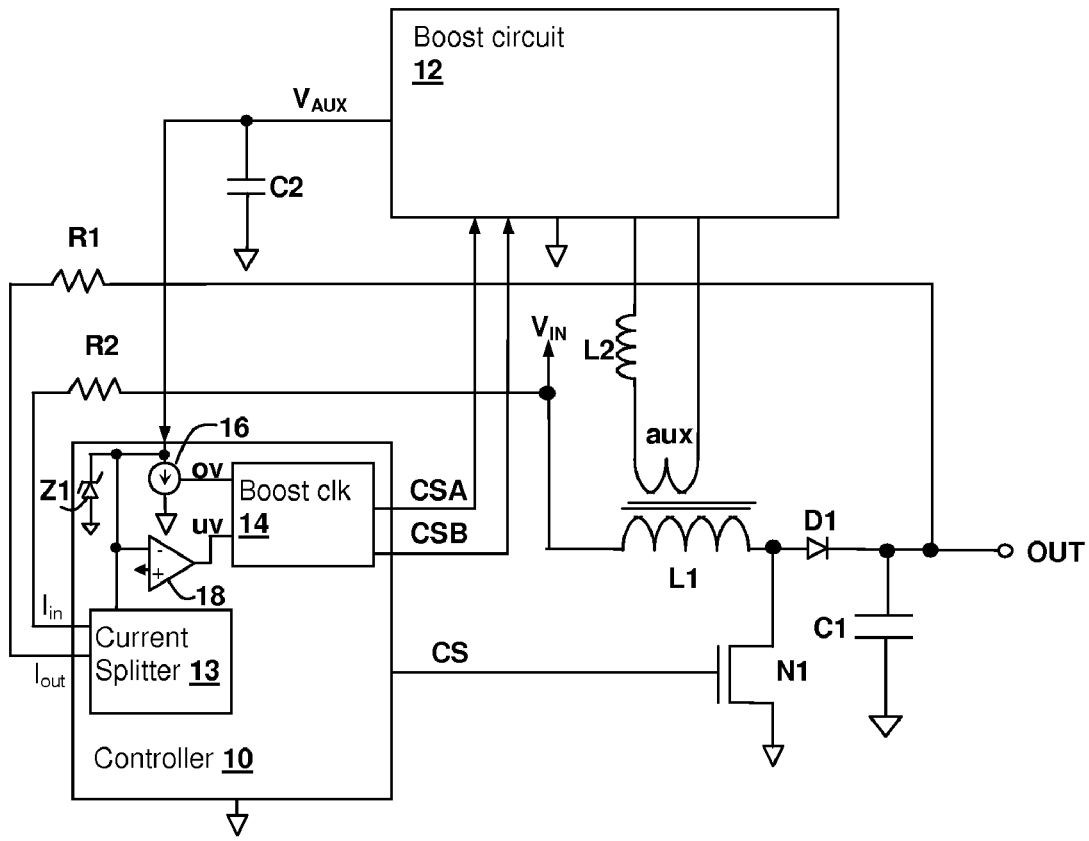
FIG. 1 is a block diagram depicting a switching converter in accordance with an embodiment of the present invention.

Referring now to FIG. 1, a switching power converter in accordance with an embodiment of the present invention is shown. A switching controller 10 provides a switching control circuit CS that controls a switching circuit implemented by a transistor N1. When transistor N1 is active, an inductive storage element supplied by inductor L1 is charged by imposing input voltage $V_{IN}$ across inductor L1, causing a current through inductor L1 to linearly increase. When transistor N1 is deactivated, charge is pushed through inductor L1 and diode D1 into capacitor C1, raising the voltage at output terminal OUT. The depicted converter forms a buck converter circuit that can control the voltage provided to output terminal OUT according to a feedback current $I_{out}$ generated through resistor R1, and an input sense current $I_{in}$, provided from input voltage $V_{IN}$ through resistor R2. A current splitter circuit 13 receives currents $I_{out}$ and $I_{in}$, and also provides initial operating current at auxiliary power supply voltage $V_{AUX}$ by charging capacitor C2.

The current supplied by current splitter circuit 13 to charge capacitor C2 is sufficient to operate controller 10, but is insufficient to charge the gate of transistor N1 for switching without recharging capacitor C2 via the operation of boost circuit 12. Boost circuit 12 operates during the initial switching events of transistor N1 to recharge capacitor C2 in order to maintain a voltage high enough to operate controller 10 and eventually establish the full voltage at auxiliary power supply voltage $V_{AUX}$ after a number of switching operations have occurred. The present invention is directed to an auxiliary power supply circuit exemplified by boost circuit 12 in FIG. 1, which is used to supply controller 10 with operational current and current to switch the gate of transistor N1 after the first switching cycle(s) of transistor N1 has commenced. Details of operation and construction of current splitter circuit 13 are disclosed in U.S. patent application "POWERING A POWER SUPPLY INTEGRATED CIRCUIT WITH SENSE CIRCUIT", Ser. No. 12/165,547, filed on Jun. 30, 2008, having inventors in common with the present application, and which is incorporated herein by reference. The exemplary buck converter illustrated in FIG. 1 is one example of a switching power circuit in which the boost circuit of the present invention may be incorporated. However, it is understood that there are other forms of switching power circuits and the techniques of the present invention as described hereinafter can be advantageously employed in other forms of switching power circuits in accordance with other embodiments of the present invention.

In the present invention, temporary power (or optionally continuous power) for operating controller 10 is provided by a boost circuit 12, which receives a signal from an auxiliary winding aux of inductor L1 and generates an auxiliary power supply voltage $V_{AUX}$. As input voltage $V_{IN}$ is applied across the primary winding of L1 while transistor N1 is active, a voltage appears across auxiliary winding aux, as given by $V_{in}*N_{aux}/N$, where $V_{in}$ is the value of input voltage $V_{IN}$, $N_{aux}$ is the number of turns in auxiliary winding aux and N is the number of turns in the primary winding of inductor L1. However, also during start-up, input voltage $V_{in}$ is also rising, and may be rising very slowly. For example, in a power supply designed for operation from a 60 Hz AC line, the full-wave rectified version of the line is a 120 Hz periodic half-sine waveform, which has a slow rate of rise. Therefore, the voltage available from auxiliary winding aux also rises slowly, which would otherwise delay the time at which power supply voltage $V_{AUX}$ is sufficient to power controller 10.

In the present invention, boost circuit 12 provides for earlier availability of power supply voltage $V_{AUX}$ sufficient to power controller 10, by boosting power supply voltage $V_{AUX}$ to a voltage higher than the peak voltage available from auxiliary winding aux. Various boost circuits suitable for boosting power supply voltage $V_{AUX}$ are described in further detail with reference to particular figures. Some of boost circuits in accordance with embodiments of the present invention require both control signals CSA and CSB, and some do not. Therefore, while controller 10 is shown as including certain circuits described below for operating boost circuit 12, it will be clear from the following description of the particular boost circuits, that controller 10 may be implemented to provide only the signals required. In some embodiments of the present invention, a boost clock circuit 14 provides a pulsed boost signal CSB at a rate substantially higher than the switching rate of switching control signal CS (e.g., 4 MHz vs. 100 kHz), in order to provide multiple "boosts" of a relatively low voltage available from auxiliary winding aux to generate a needed voltage level from power supply voltage $V_{aux}$ at an early point in the start-up phase of the power switching converter circuit. Another control signal CSA, which may be the same as switching control signal CS, can be used to provide an indication of the polarity of the voltage across winding aux and used within boost circuit 12 to actively rectify the voltage supplied by auxiliary winding aux, which can provide for generation of a positive or negative output voltage $V_{aux}$ without dictating a required startup polarity of inductor current and relationship of the polarity of the auxiliary winding to the primary winding of the inductive storage element.

Additionally, since the boosting action can potentially boost the voltage of power supply voltage $V_{aux}$ to a level higher than required, as in the multiple boost pulse embodiment, where the number of pulses dictates the amount of boost, an overvoltage circuit 16 may be included to terminate the generation of boost pulses in signal CSA by boost clock 14. Overvoltage circuit 16 is depicted as a shunt regulator that can also ensure that excess voltage development on power supply voltage $V_{aux}$ is absolutely prevented by discharging power supply voltage $V_{aux}$ as a threshold voltage is approached/reached. Finally, since under certain operating conditions such as zero-loading, in which the bursts are far apart in time, and under low line voltage conditions, in which the voltage across auxiliary winding aux diminishes, power supply voltage $V_{aux}$ may fall too low. An under-voltage detector 18 may be provided to resume boosting within boost circuit 12 to restore power supply voltage $V_{aux}$.

In general, it is desirable in the active boosting embodiments of the present invention, to design inductor L1 so that under normal loading conditions, the voltage provided by auxiliary winding aux is sufficient to provide the required voltage at power supply voltage $V_{aux}$ by passive rectification. The active boosting action and optional active rectification can be terminated after the early stages of startup and resumed if an under-voltage condition occurs.

Figure 2A:
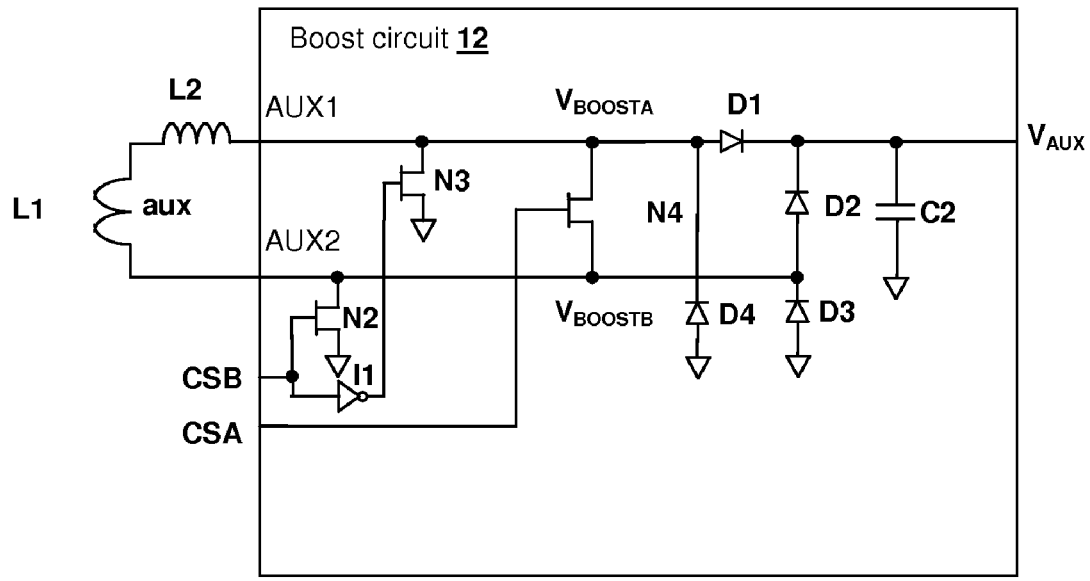
FIG. 2A is a schematic diagram depicting details of boost circuit 12 of FIG. 1 in accordance with an embodiment of the present invention.

Referring now to FIG. 2A, details of boost circuit 12 of FIG. 1 are shown. Auxiliary winding aux is coupled to a boost switch formed by transistor N4, controlled by control signal CSA, which provides boost pulses that short auxiliary winding aux of inductor L1 and optional additional inductor L2. Inductor L2 is optionally provided and connected in series with auxiliary winding aux if the leakage inductance of auxiliary winding aux is not high enough to provide sufficient boost operation. Active rectification of the output of auxiliary winding aux is provided by a pair of transistors N2 and N3 that short one of terminals AUX1 or AUX2 according to the direction of current through auxiliary winding aux, so that a positive voltage is supplied at node $V_{BOOSTA}$. Inverter I1 inverts control signal CSB to provide the proper polarity for controlling transistor N3. Diodes D3 and D4 ensure that the voltage of either node coupled to the boost switched formed by transistor N4 is at most a diode drop below ground (e.g., −0.7V). Diodes D1 and D2 transfer energy from the positive pulses into capacitor C2 which provides power supply voltage $V_{aux}$. While a positive power supply is illustrated, it is understood that a negative power supply can be implemented by changing the polarity of the elements.

Figure 3A:
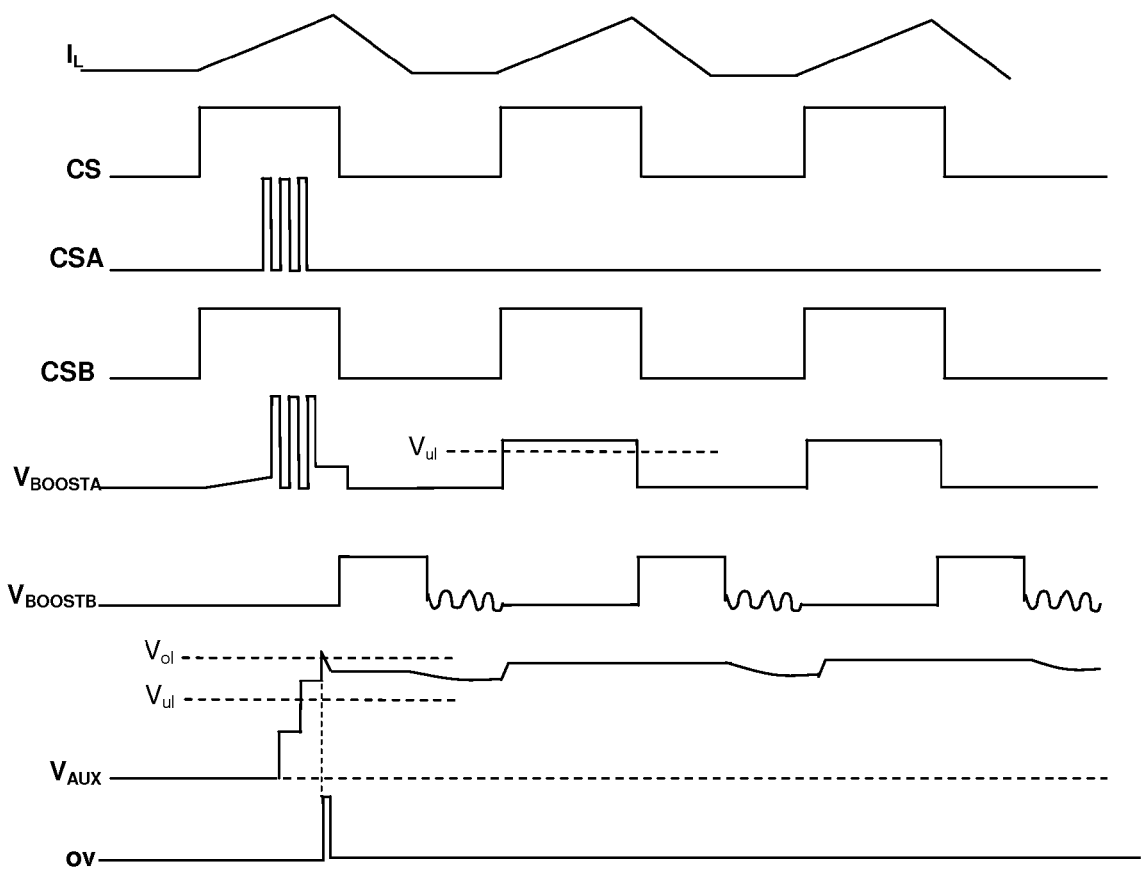
FIG. 3A is a timing diagram depicting details of operation of boost circuit 12 of FIG. 2A in accordance with an embodiment of the invention.

Referring now to FIG. 3A, operation of the circuit of FIG. 1 using boost circuit 12 of FIG. 2A is illustrated in accordance with an embodiment of the invention. Trace $I_L$ depicts the current in the primary winding of inductor L1. Control signal CS shows the state of the switching control signal that dictates the current direction in inductor L1. Control signal CSA provides three boost pulses, which cause power supply voltage $V_{aux}$ to be boosted in steps according to the magnitude of voltage on node $V_{BOOSTA}$ after each pulse of control signal CSA have ended. After the third pulse, power supply voltage Vaux has exceeded an overvoltage limit $V_{ol}$ causing the output ov of over-voltage detector 16 to be asserted, which terminates the production of pulses on control signal CSA. Voltage $V_{ul}$ illustrates a voltage below which power supply voltage $V_{aux}$ would trigger resumption of boost pulses. After the boost pulses have terminated, and operation of the switching power converter has stabilized, subsequent operation of the auxiliary power supply continues, generally without requiring boost operation at all, except perhaps under substantially zero-load and low line operating conditions as mentioned above. The active rectification continues in the illustrated example, providing a positive voltage on node $V_{BOOSTB}$ in alternation with the voltage on node $V_{BOOSTA}$ and the only droop in power supply voltage $V_{aux}$ occurs during the intervals when no current is present in inductor L1, which occurs only when operating in discontinuous conduction mode (DCM).

Figure 2B:
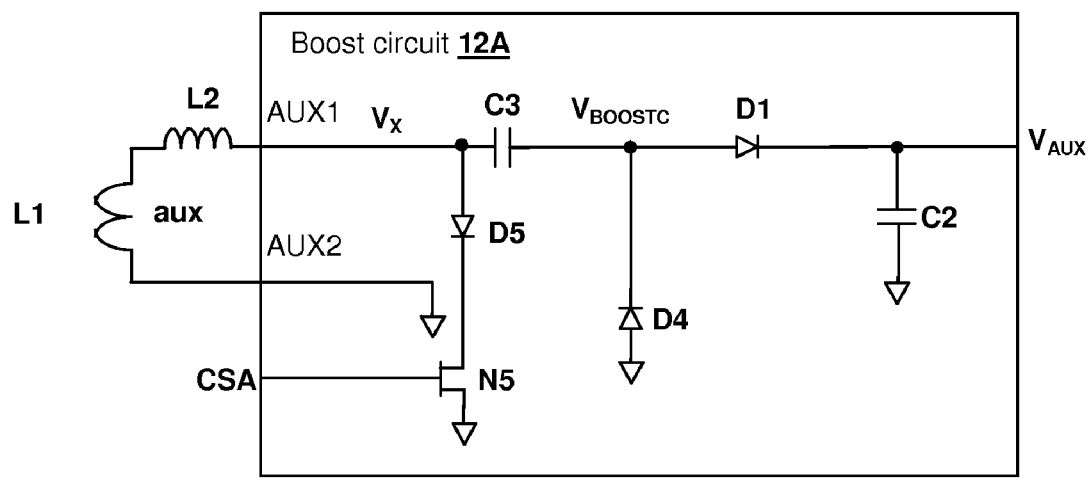
FIG. 2B is a schematic diagram depicting details of another boost circuit 12A in accordance with another embodiment of the present invention that may be used in place of boost circuit 12 of FIG. 1.

Referring now to FIG. 2B, a boost circuit 12A that may be used in the circuit of FIG. 1 in place of boost circuit 12 of FIG. 2A is illustrated. In boost circuit 12A, a diode D5 is connected in series with a boost switching transistor N5, which is generally operated only while a positive potential is present at the anode of diode D5. Control signal CSA is used to control transistor N5 to substantially short either the leakage inductance of auxiliary winding aux, along with optional boost inductor L2 when control signal CSA is pulsed active. At the end of each of the boost pulses in control signal CSA the rising voltage $V_x$ across auxiliary winding aux and optionally across boost inductor L2 is passed through capacitor C3 to generate a voltage on node $V_{BOOSTC}$, which is provided through diode D1 to charge capacitor C2 as described above with respect to boost circuit 12 of FIG. 2A. Boost circuit 12A of FIG. 2B has the advantage of requiring less components than boost circuit 12A circuit of FIG. 2A, but does not include the active rectification implemented in boost circuit 12 of FIG. 2A, and therefore generates a boosted power supply voltage $V_{aux}$ in response to a single polarity of current through auxiliary winding aux (and optionally across boost inductor L2).

Figure 3B:
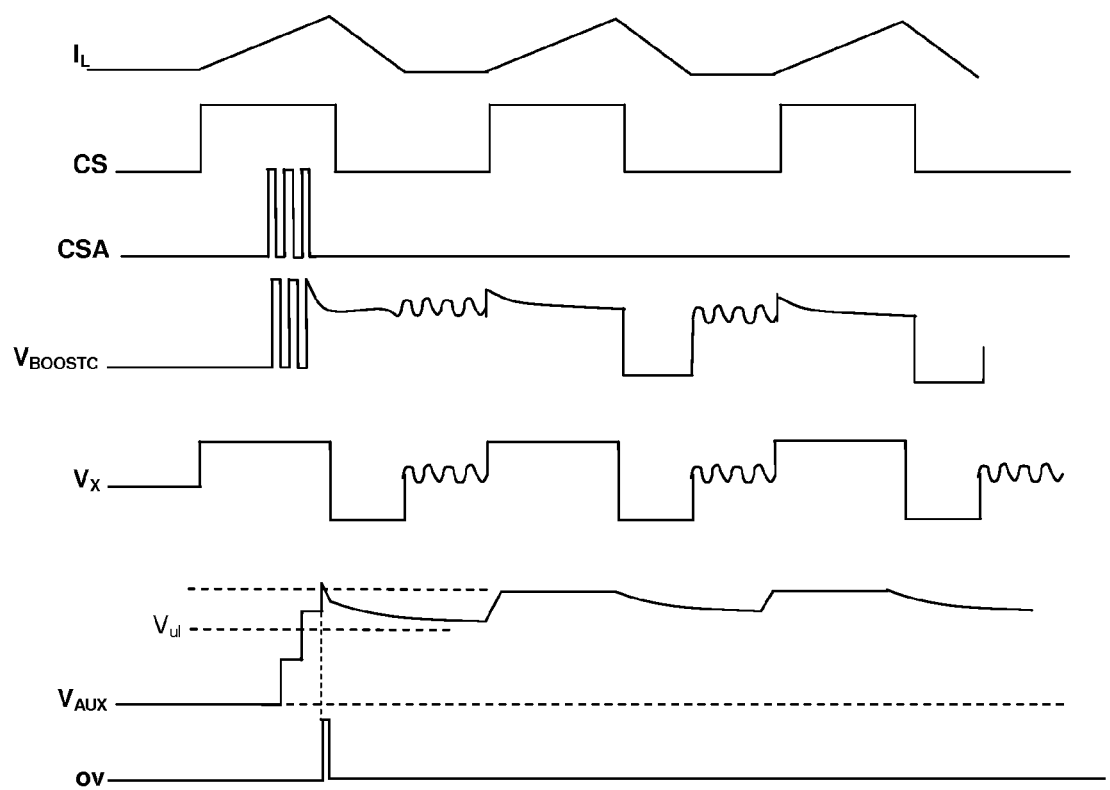
FIG. 3B is a timing diagram depicting details of operation of boost circuit 12A of FIG. 2B in accordance with an embodiment of the invention.

Referring now to FIG. 3B, operation of the circuit of FIG. 1 using boost circuit 12A of FIG. 2B is illustrated in accordance with an embodiment of the invention. Trace $I_L$ depicts the current in the primary winding of inductor L1. Control signal CS shows the state of the switching control signal that dictates the current direction in inductor L1. Control signal CSA provides three boost pulses, which cause power supply voltage $V_{aux}$ to be boosted in steps according to the magnitude of voltage on node $V_{BOOSTA}$ after each pulses of control signal CSA have ended. After the third pulse, power supply voltage $V_{aux}$ has exceeded an overvoltage limit $V_{ol}$ causing the output ov of over-voltage detector 16 to be asserted, which terminates the production of pulses on control signal CSA. Voltage $V_{ul}$ illustrates a voltage below which power supply voltage $V_{aux}$ would trigger resumption of boost pulses. Ripple in power supply voltage $V_{aux}$ is slightly higher than for boost circuit 12 of FIG. 2A, as capacitor C2 is charged only when current $I_L$ is increasing, which is the condition for a positive voltage at auxiliary winding terminal AUX1, with respect to terminal AUX2.

In the embodiment described above, the turns ratio of the primary winding of inductor L1 to auxiliary winding aux is chosen as a sufficiently low value, so that sufficient energy is transferred through auxiliary winding aux to charge capacitor C2 under maximum loading conditions at each switching cycle after the initial boost pulse burst has "speeded" the charging of capacitor C2 at startup. However, such operation can significantly reduce the efficiency of the overall power converter due to generation of higher voltages across capacitor C2 after start-up than are needed for operation of the circuits connected to the auxiliary supply, resulting in a waste of energy when the voltage across C2 is regulated to a lower voltage for use in operating circuits of controller 10. In accordance with other embodiments of the present invention, the turns ratio of inductor L1 can be raised, decreasing the voltage across capacitor C2 after start-up, with a slight delay in the start-up voltage rise provided by the boost circuit.

Figure 4:
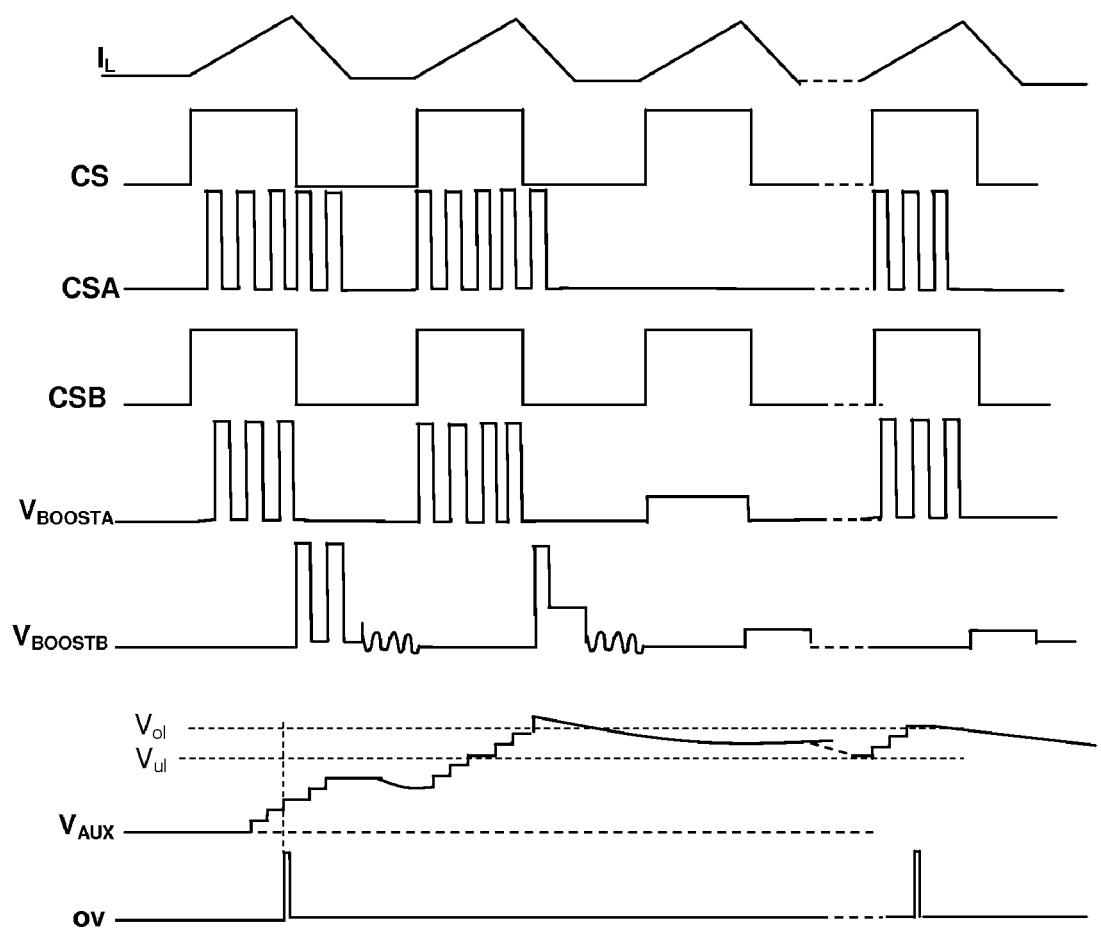
FIG. 4 is a timing diagram depicting details of operation of boost circuit 12 of FIG. 2A, in accordance with another embodiment of the invention.

Referring now to FIG. 4, operation of the circuit of FIG. 1 using boost circuit 12 of FIG. 2A is illustrated in accordance with another embodiment of the invention. FIG. 4 is similar to FIG. 3A, and so only differences between the Figures will be described below. Further, while the operation of auxiliary boost circuit 12 is illustrated in FIG. 4 in particular, it is understood that the techniques described below may also be applied to boost circuit 12A of FIG. 2B. In contrast to the operation depicted in FIG. 3A, in FIG. 4, control signal CSA provides boost pulses for several cycles of control signal CS before power supply voltage $V_{aux}$ is boosted to overvoltage limit $V_{ol}$, and terminating the production of pulses on control signal CSA. After the boost pulses have terminated, and operation of the switching power converter has stabilized, subsequent operation of the auxiliary power supply continues, with the boost operation required only intermittently.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A switched-power circuit, comprising:
an inductive storage element for coupling an input of the switched-power circuit to an output of the switched-power circuit and having a primary winding and an auxiliary winding;
a switching circuit for controlling charging of the inductive storage element from an input voltage source connected to the input of the switched-power circuit to the primary winding of the inductive storage element;
a control circuit coupled to the switching circuit for generating control signals for operating the switching circuit in response to a feedback signal provided from the output of the switched-power circuit; and
a boost circuit having a boost input coupled to the auxiliary winding of the inductive storage element for supplying power to the control circuit from a boost output, wherein the boost circuit provides a boost output voltage at the boost output that is boosted to a voltage substantially greater than a voltage across the auxiliary winding at least during start-up of the switched-power circuit by storing energy provided from the auxiliary winding in a storage inductance at a voltage substantially equal to the voltage across the auxiliary winding and releasing energy from the storage inductance at the substantially greater voltage of the boost output.

2. The switched-power circuit of claim 1, wherein the boost circuit uses a leakage inductance of the auxiliary winding as the storage inductance to boost an available voltage across the auxiliary winding by substantially shorting the auxiliary winding for a time period and after the end of the time period, applying the auxiliary winding across the boost output.

3. The switched-power circuit of claim 1, wherein the storage inductance is second inductive storage element coupled in series with the auxiliary winding, and wherein the boost circuit boosts an available voltage across the auxiliary winding by substantially shorting the series combination of the second inductive storage element and the auxiliary winding for a time period, and after the end of the time period, applying the series combination of the second inductive storage element and the auxiliary winding across the boost output.

4. The switched-power circuit of claim 1, wherein the boost circuit includes an active switch for providing a low-impedance path across the auxiliary winding in response to a boost pulse signal, whereby after a pulse of the boost pulse signal has ended, a voltage is produced across a leakage inductance of the auxiliary winding or inductor in series with the auxiliary winding that is substantially higher than an open-circuit voltage available at across the auxiliary winding.

5. The switched-power circuit of claim 4, wherein the boost pulse signal is a repetitive pulse signal having multiple periods within a single period of a switching rate of the switching circuit of the switched-power circuit.

6. The switched-power circuit of claim 5, further comprising a first detector for detecting when a magnitude of an output of the boost circuit has exceeded a first predetermined voltage, and wherein the boost pulse signal is terminated in response to an output of the first detector.

7. The switched-power circuit of claim 6, further comprising a second detector for detecting when the magnitude of the output of the boost circuit has fallen below a second predetermined voltage, and wherein the boost pulse signal is re-started in response to an output of the second detector.

8. The switched-power circuit of claim 1, further comprising at least one active rectifier switch, for alternatively reversing a polarity of an output of the auxiliary winding with respect to an output of the boost circuit, whereby a boosted output of the boost circuit can be generated while the inductive storage element is being charged or being discharged.

9. The switched-power circuit of claim 8, wherein the at least one active rectifier switch is controlled in conformity with a control signal that controls the switching circuit.

10. The switched-power circuit of claim 1, wherein the boost circuit is selectively operated so that the boosting of the voltage at the boost output is disabled at least a portion of a time while the switched-power circuit is operating after start-up of the switched-power circuit.

11. A method of controlling a switched-power circuit, comprising:
switching an input voltage source across a primary winding of an inductive storage element to transfer power to an output of the switched-power circuit, wherein the inductive storage element has the primary winding and an auxiliary winding;
controlling a period of the switching in conformity with a feedback signal provided from the output of the switched-power circuit; and
boosting a voltage of the auxiliary winding of the inductive storage element for supplying power to a control circuit that performs the controlling, wherein the boosting provides a boost output voltage that is substantially greater than a voltage across the auxiliary winding at least during start-up of the switched-power circuit by storing energy provided from the auxiliary winding in a storage inductance at a voltage substantially equal to the voltage across the auxiliary winding and releasing energy from the storage inductance at the substantially greater boost output voltage.

12. The method of claim 11, wherein the boosting comprises substantially shorting the auxiliary winding to store energy in the leakage inductance of the auxiliary winding, wherein the storage inductance is provided by the leakage inductance of the auxiliary winding, and subsequently ending the shorting to boost an available voltage across the auxiliary winding and applying the auxiliary winding across the boost output.

13. The method of claim 11, wherein the boosting comprises substantially shorting a series combination of the auxiliary winding and another boost inductor to store energy in the boost inductor, wherein the boost inductor provides the storage inductance, and subsequently ending the shorting to boost an available voltage across the auxiliary winding and applying the auxiliary winding across the boost output.

14. The method of claim 11, wherein the boosting comprises:
actively switching a low-impedance path across the auxiliary winding in response to a boost pulse signal;
deactivating the low-impedance path across the auxiliary winding in response to an end of the boost pulse signal, wherein the storage inductance is provided by a leakage inductance of the auxiliary winding, whereby a voltage is produced across the leakage inductance of the auxiliary winding or inductor in series with the auxiliary winding that is substantially higher than an open-circuit voltage available at across the auxiliary winding.

15. The method of claim 14, wherein the boost pulse signal is a repetitive pulse signal having multiple periods within a single period of a switching rate of the switching.

16. The method of claim 15, further comprising:
first detecting when a magnitude of an output of the boost circuit has exceeded a first predetermined voltage; and
stopping generation of the boost pulse signal when the first detecting detects that the magnitude of the output of the boost circuit has exceeded the first predetermined voltage.

17. The method of claim 15, further comprising:
second detecting that the magnitude of the output of the boost circuit has fallen below a second predetermined voltage; and
resuming generation of the boost pulse signal when the second detecting detects that the magnitude of the output of the boost circuit has fallen below the second predetermined voltage.

18. The method of claim 17, further comprising actively rectifying an output of the auxiliary winding, whereby the boosting can be performed while the inductive storage element is being charged or being discharged.

19. The method of claim 18, wherein the actively rectifying is performed in response to a control signal that controls the switching circuit.

20. The method of claim 11, further comprising disabling the boosting for at least a portion of a time of operation of the switched-power circuit subsequent to the start-up of the switched-power circuit.

21. An integrated circuit, comprising:
a switching control circuit for controlling a switch for charging an external inductive storage element through a primary winding in response to a feedback signal provided to the integrated circuit; and
a boost circuit having an input coupled to a boost input terminal for coupling the integrated circuit to an auxiliary winding of the external inductive storage element, wherein the boost circuit supplies power to the switching control circuit from a boost output, wherein the boost circuit provides a voltage at the boost output that is boosted to a voltage substantially greater than a voltage across the auxiliary winding at least during start-up of the integrated circuit by storing energy provided from the auxiliary winding in a storage inductance at a voltage substantially equal to the voltage across the auxiliary winding and releasing energy from the storage inductance at the substantially greater voltage of the boost output, and wherein the boost circuit includes an active switch for providing a low-impedance path across the auxiliary winding in response to a boost pulse signal.

22. The integrated circuit of claim 21, wherein the boost pulse signal is a repetitive pulse signal having multiple periods within a single period of a switching rate of the switching circuit of the switched-power circuit.

23. The integrated circuit of claim 22, further comprising a first detector for detecting when a magnitude of an output of the boost circuit has exceeded a first predetermined voltage, and wherein the boost pulse signal is terminated in response to an output of the first detector.

24. The integrated circuit of claim 23, further comprising a second detector for detecting when the magnitude of the output of the boost circuit has fallen below a second predetermined voltage, and wherein the boost pulse signal is restarted in response to an output of the second detector.

25. The integrated circuit of claim 21, further comprising at least one active rectifier switch, for alternatively reversing a polarity of an output of the auxiliary winding with respect to an output of the boost circuit, whereby a boosted output of the boost circuit can be generated while the external inductive storage element is being charged or being discharged.

26. The integrated circuit of claim 25, wherein the at least one active rectifier switch is controlled in conformity with a control signal that controls the switching circuit.

27. The integrated circuit of claim 21, wherein the boost circuit is selectively operated so that the boosting of the voltage at the boost output is disabled at least a portion of a time while the integrated circuit is operating after start-up of the integrated circuit.

* * * * *